United States Patent Office 3,426,525
Patented Feb. 11, 1969

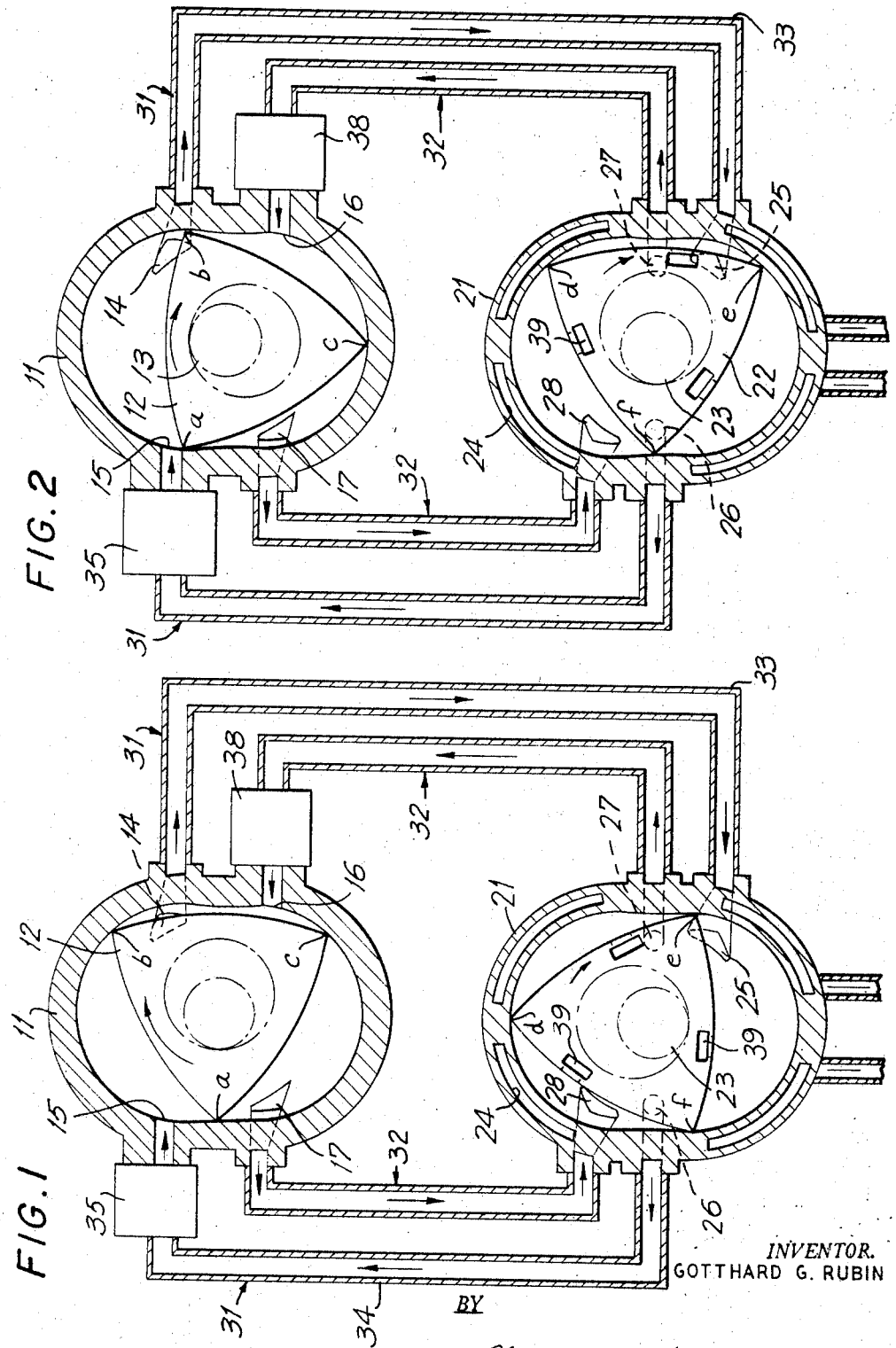

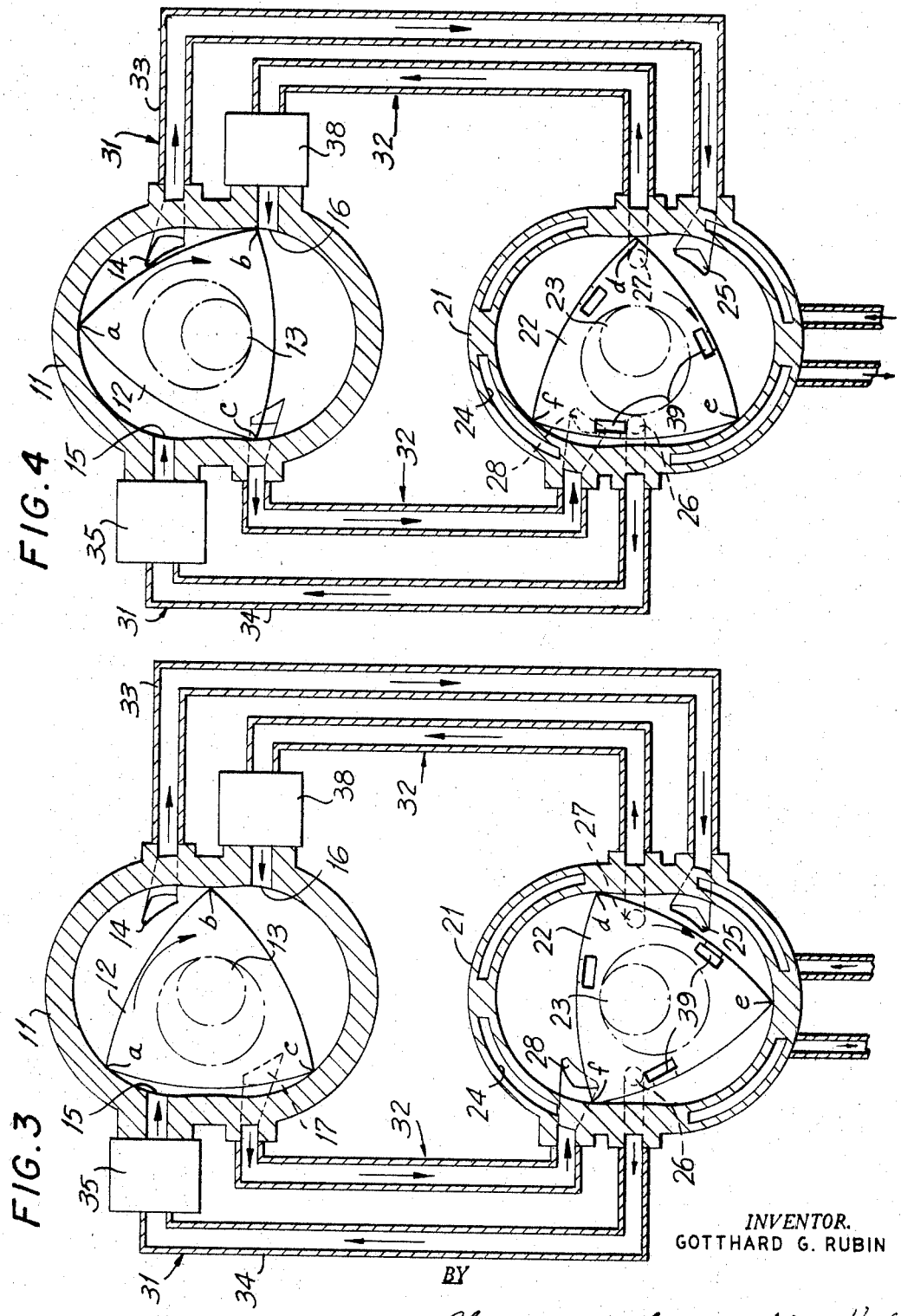

3,426,525
ROTARY PISTON EXTERNAL COMBUSTION ENGINE
Gotthard G. Rubin, 748 Hollywood Ave., New York, N.Y. 10465
Filed Aug. 10, 1967, Ser. No. 659,706
U.S. Cl. 60—24                                    10 Claims
Int. Cl. F03g 7/06; F01k 23/02

ABSTRACT OF THE DISCLOSURE

An engine having at least two trochoidal chambers, each with a rotary piston, drivingly connected to an output shaft. The chambers are connected together through a pair of regenerative paths through which gas flows with the gas being heated prior to entry to one chamber and being cooled in the other chamber whereby the compression and expansion of the gas as it flows through the regenerative cycle develops usable work energy.

Background of the invention

This invention relates generally to an external combustion engine wherein work energy is developed from at least a pair of interconnected chambers which provide for compression and expansion of gases which are heated prior to expansion.

The rotary engine has been developed as an internal combustion engine wherein a charge is injected into a chamber, compressed, ignited and then expanded to drive the piston for work output. All phases of the cycle, including combustion, take place within the chamber in which the piston rotates.

It has also been known in the art to utilize the heating and expansion of the gases to rotate a turbine or rotary piston in order to develop useful work energy.

The rotary engine, sometimes known as the Wankel engine, has proven satisfactory as an internal combustion engine, with the greatest problem presented in the Wankel engine, from a commercial viewpoint, being the sealing of the piston within the chamber. This problem has been further accentuated by the fact that the Wankel engine is an internal combustion engine whereby explosion takes place within the chamber when the piston has sealed off the ports.

The rotary heat engines, on the other hand, have generally proven unsatisfactory from the viewpoint of power to volume ratio and power to weight ratio.

Summary of the invention

Generally speaking, in accordance with the invention, a hot chamber and a cold chamber are interconnected through two regenerative paths. Each chamber is provided with a rotary piston connected to interconnected shafts for power takeoff. One chamber is considered the "cool" chamber and is provided with cooling means. In this chamber, expanded gas exhausted from the other ("hot") chamber is cooled and compressed and the compressed gas is delivered to an input of the hot chamber. The gas is heated by external means prior to entry into the hot chamber. The gas expands in the hot chamber and the expansion drives the rotary piston in the usual manner of expanding gases. Two closed circuit loops are provided to make maximum utilization of the rotation of the rotary piston and the gas in one closed circuit loop is actually independent of the gas in the other closed circuit loop. Additional cooling means for cooling the hot, expanded gas delivered from the hot chamber may also be provided.

Accordingly, it is an object of this invention to provide an improved type of rotary external combustion engine.

Another object of the invention is to provide an improved type of engine which converts heat energy into mechanical work.

A further object of the invention is to provide a two chamber system rotary engine having regenerative closed circuit paths between the two chambers, which chambers operate at a temperature differential.

Still another object of the invention is to provide an improved type of external combustion engine with minimal moving parts.

A still further object of the invention is to provide an improved type of engine having at least two chambers with maximum thermal heat differential between the chambers.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

Brief description of the drawings

For a fuller understanding of the invention, reference is had to the following description taken in connection with the accompanying drawings, in which:

FIG. 1 is a schematic diagram of a two chamber rotary external combustion engine constructed in accordance with the instant invention;

FIGS. 2, 3 and 4 are schematic diagrams similar to FIG. 1 but showing the relative position of the various parts at different times during the cycle of rotation of the engine.

Description of the preferred embodiments

Figure 5:
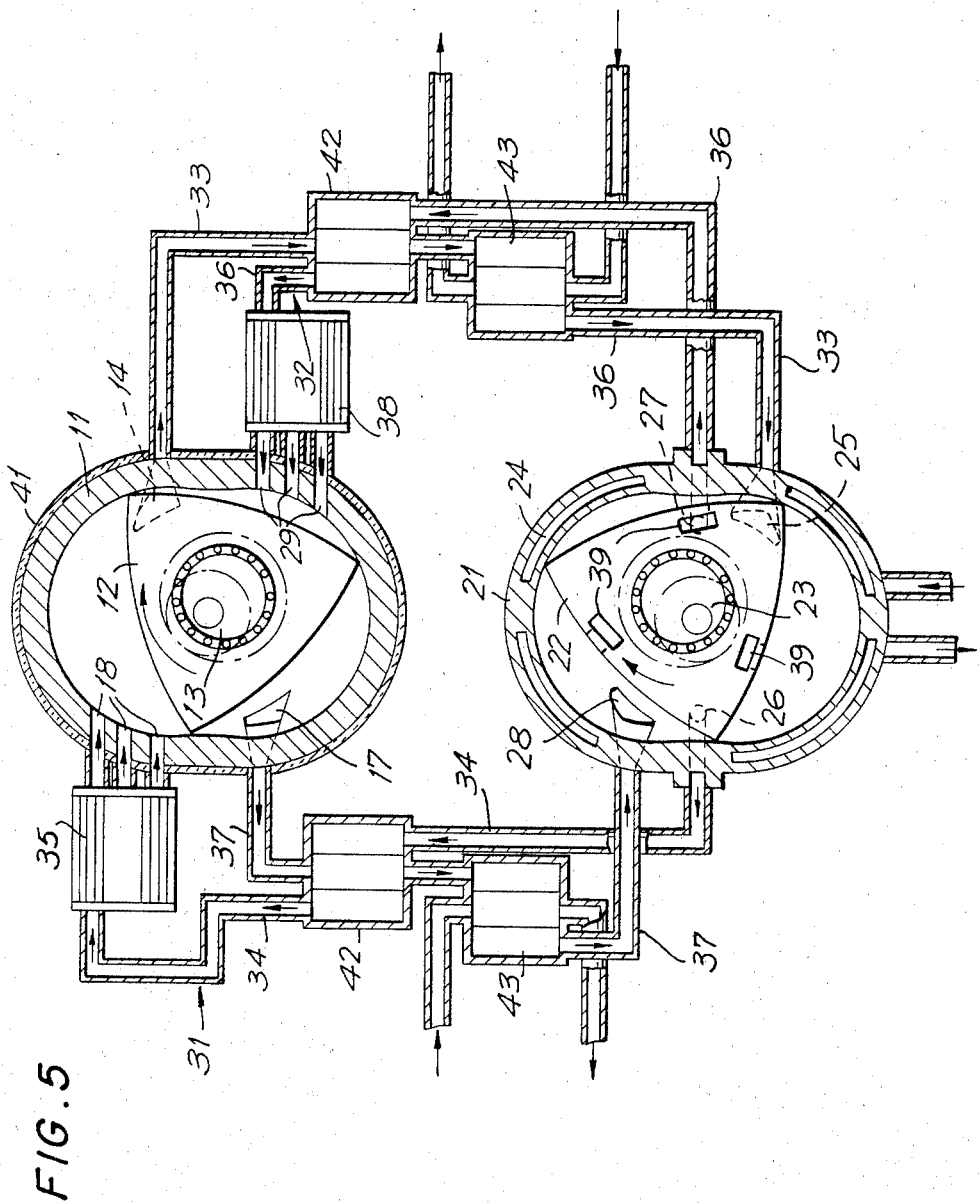
FIG. 5 is a schematic diagram of a modified form of the invention.

The rotary engine which consists generally of a trochoidal chamber and a polygonal piston is generally known in the art and thus specific details thereof are deemed unnecessary for an understanding of the invention herein. Reference is made to Wankel U.S. Patent No. 2,988,065, issued June 13, 1961, for a more detailed description of the chamber and piston.

In the preferred embodiment, two chambers are shown. While the chambers are shown as having the same displacement, it is not necessary that all chambers be of equal displacement. For example, if the volume of the cool chamber is greater than that of the hot chamber, cooling and compression would be advantageously effected. Chamber 11 may be characterized as the hot chamber and chamber 21 as the cool chamber. Each chamber has a trochoidal configuration with a generally triangular piston 12 mounted for rotation in chamber 11 and a generally triangular piston 22 mounted for rotation in chamber 21.

An output shaft 13 is provided for the hot chamber and a shaft 23 for the cool chamber which shafts are interconnected by any suitable means (not shown) with the respective pistons being mounted for eccentric rotation thereon so that the lobes of the piston travels in contact with the surface of its respective chamber. A more detailed description of the eccentric mounting and rotation of the piston may be found in the aforesaid Wankel patent.

Cool chamber 21 is preferably provided with cooling passage 24 through which a cooling medium, such as water, may flow in order to improve the cooling of the gases in the cool chamber, as will be hereafter described.

Two regenerative closed loops connect the hot and cool chambers through ports which communicate with the interior of each chamber, with the closing off of the ports being effected by rotation of the piston within the cylinder, thereby eliminating the need for mechanical valves.

For simplicity, one of the closed loops will be characterized as first loop 31 and the other loop will be characterized as second loop 32. Loop 31 consists of an outlet port 14 in the hot chamber, an inlet port 25 in the cool chamber, a conduit 33 connecting outlet port 14 to inlet port 25, an inlet port 15 in the hot chamber, an outlet port 26 in the cool chamber, and a conduit 34 connecting outlet port 26 with inlet port 15. A heater 35 communicates with conduit 34 whereby gases traveling through the conduit are heated externally of the hot chamber, as will be discussed in greater detail hereafter.

Heater 35 may be of any suitable design and utilize any suitable fuel which will have the effect of heating the gases passing therethrough. For example, gas burners applying heat to coils within the heater which communicate with conduit 34 would comprise one form of heater 35.

Second loop 32 consists of an outlet port 27 in the cool chamber, an inlet port 16 in the hot chamber, a conduit 36 connecting outlet port 27 to inlet port 16, an outlet port 17 in the hot chamber, an inlet port 28 in the cool chamber and a conduit 37 connecting outlet port 17 to inlet port 28. A heater 38 is also provided in communication with conduit 37 for heating of the gases flowing through the second loop prior to entry into the hot chamber.

The entire system is filled with any suitable gas, such as air, helium, hydrogen, or any other gas that will operate satisfactory. Since an explosive charge will not be introduced into the gas during the cycle of operation, the gas will not become contaminated. Ideally, there is no external intake or exhaust for the closed circuit system and thus there will be no accumulation of debris, residue or unburned materials which tend to have a deteriorating effect, over a long period of time, in internal combustion engines. Since leakage could occur, it may be desirable to maintain the system at above ambient pressure at all times such as by means of a pump, pressure tank or the like to prevent entry of foreign matter into the system.

For simplicity of description, each lobe of each piston will be identified by reference letter and the area defined by a face of the piston and the walls of the chamber at any particular instant will be identified, with reference to the drawings, by recitation of the two lobes of the piston that define the limit of the particular chamber. The lobes of the piston in the hot chamber are identified by the letters $a$, $b$ and $c$ while the lobes of the piston in the cool chamber are identified by the letters $d$, $e$ and $f$. Passages 39 are provided in the piston in the cool chamber for porting the compressed gases in each loop through the respective outlet ports.

The cycle of operation will now be described and it should be noted that both pistons rotate in the clockwise direction. Referring to FIG. 1, the chamber defined by lobes $b$, $c$ reached minimal size and substantially all gas in the first loop has been exhausted through conduit 33 and delivered into the cool chamber through port 25 into a chamber defined by lobes $e$, $f$. As rotation of the piston in the cool chamber continues, the chamber defined by lobes $e$, $f$ commences a reduction in volume as shown in FIG. 2 to thereby compress the gas while same is being cooled in the cool chamber as a result of the cooling liquid flowing through passages 24. When compression is complete, the chamber defined by lobes $e$, $f$ communicates through the appropriate passage 39 with the outlet port in the cool chamber (FIG. 3) and the compressed gas travels through conduit 34 toward the hot chamber. The compressed gas passes through heater 35 to substantially increase its energy level and the gas thereupon enters the hot chamber through inlet port 15 (FIG. 3) into the chamber defined by lobes $c$, $a$. As the piston in the hot chamber continues to rotate, lobe $c$ seals off outlet port 17 (FIG. 4) and the hot, compressed gases expand and drive the piston to thereby convert the heat energy to work energy. While expansion in chamber $c$, $a$ is taking place (FIG. 4) chamber $a$, $b$ is nearing completion of the exhaust cycle. Referring back to FIG. 1, chamber $a$, $b$ was expanding under the driving force of the expanding hot gases to the fully expanded condition shown in FIG. 2 and thereafter the chamber $a$, $b$ commenced reduction in size (FIG. 3) until the hot expanded gases were exhausted through conduit 33 to the cool chamber.

As rotation of the piston in each chamber continues, gases are exhausted from the hot chamber and delivered to the cool chamber where they are cooled, compressed and delivered, while being heated, to the hot chamber where the gases expand and drive the pistons to perform useful work.

The second loop operates in a similar manner and provides for complete utilization of the cycle of rotation of each piston in its trochoidal chamber.

Referring again to FIG. 1, chamber $a$, $c$ in the hot chamber is shown as having just completed full expansion and is exhausting the gases through port 17 and conduit 37 to chamber $f$, $d$ in the cool chamber. As exhaust from chamber $a$, $c$ nears completion (FIG. 2), cool chamber $f$, $d$ approaches maximum volume which has been attained in FIG. 3 and compression commences (FIG. 4). On completion of compression, the cool compressed gas is delivered through passage 39, outlet port 27 and conduit 37 to the heater 38 which heats the compressed gas.

FIG. 1 shows the piston in the cool chamber reaching completion of the compression cycle and the piston in the hot cylinder completing exhaust from the first loop and commencing intake in the second loop. Referring to FIG. 2, the hot gases are delivered through inlet port 16 into chamber $c$, $b$ and expansion commences to drive the piston in the hot chamber as shown in FIG. 3 until expansion is complete (FIG. 4).

Thus, with each complete rotation of the piston in the hot chamber, two work cycles result, one from the expansion of the gases received in the first loop and the other from the expansion of the gases received from the second loop. In a like manner, two compression cycles are completed by the piston in the cool chamber during each complete cycle of rotation thereof.

The two regenerative cycles continue concurrently and at any instant of time, the specific operation being performed in any part of the hot or cool chambers may be analysed. For complete understanding, the operations taking place at the instant shown in FIG. 1 will now be described. In the hot chamber, the chamber defined by lobes $a$, $b$ is undergoing expansion of the hot, compressed gases and this is the work portion of the cycle. The chamber defined by lobes $b$, $c$ is completing exhaust of the previously expanded gases in the first loop and commencing intake of the hot, compressed gases in the second loop. The chamber defined by lobes $c$, $a$ is commencing exhaust of the previously fully expanded gases in the second loop. In the cool chamber, compression of the gases has been completed in the chamber defined by lobes $d$, $e$ and the compressed gases are being delivered to the heater in the second loop. In the chamber defined by lobes $e$, $f$ intake of the previously expanded gases in the first loop is being completed and the gases are being cooled prior to compression. In the chamber defined by lobes $f$, $d$ delivery of the compressed gases to the heater in loop number one has been completed and intake of the exhausted gases in loop number two is commencing.

The sequence of events within each of the chambers and between the chambers will be a result of location of the ports within each chamber and the timing or phase relationship as between the pistons of the two chambers. The primary functions of the hot chamber are intake, expansion and exhaust, while the primary functions in the second chamber are intake, compression and exhaust in addition to the cooling of the gases constantly taking place in the cool chamber for added thermal efficiency.

While two chambers each having a three lobed piston is shown for sake of illustration, it should be understood that the invention is not limited to the use of two chambers or to the use of a piston having only three lobes.

FIG. 5 discloses an alternate embodiment of the instant invention wherein like reference numerals indicate like parts. Cool chamber 12 is substantially the same as the cool chamber described in connection with FIGS. 1–4 while hot chamber 11 is preferably provided with a thermal insulating jacket 41 which reduces loss of heat from the hot chamber. Heaters 35 and 38 communicate with the hot chamber through multiple port inlet ports 18 and 29, respectively.

The heat energy of the expanded hot gases being exhausted from the hot chamber in each loop is used to preheat the cool, compressed gases being delivered from the cool chamber to the main heater in the other loop. Referring to the right hand side of FIG. 5, hot, expanded gases are exhausted from the hot chamber in the first loop through port 14 and conduit 33. These hot, expanded gases pass through a heat exchanger 42 and thence through auxiliary cooler 43 to provide maximum temperature reduction of the gases entering through conduit 33 into the cool chamber for compression. The compressed gases in the second loop are delivered from the cool chamber through port 27 and conduit 37. These cool gases also travel through heat exchanger 42 to heater 38 in the same manner as described in connection with FIGS. 1 and 4. However, within heat exchanger 42, the hot, expanded gases being delivered from the hot chamber in loop 1 are in heat exchange relationship with the cool, compressed gases being delivered from the cool chamber in loop number 2 to thereby increase the efficiency of the system whereby the gases that are to be cooled are used to preheat the gases that are to be heated. Naturally, no intermixing of the gases takes place in the heat exchanger.

The heat exchanger and cooler shown on the left side of FIG. 5 operates in the manner aforesaid except that the hot gases entering the heat exchanger are from the second loop and the cool, compressed gases are from the first loop.

With the foregoing invention, an engine of high efficiency is provided utilizing the principles of the trochoidal chamber and polygonal piston. The closed loop system prevents contamination of the gases and the elimination of the internal combustion system reduces stress on the seal at the lobe of each piston. Such seal has been one of the major problems in designing and production of rotary piston engines.

It is also desirable to provide for lubrication of the system and moving parts such as by the addition or periodic injection of lubricant to the gas, or by others suitable lubricating arrangements.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An engine comprising at least two trochoidal chambers, a polygonal piston rotatably mounted in each chamber, at least one inlet port and at least one outlet port in each of said chambers, and at least one closed circuit loop connecting ports of one of said chambers to opposite ports of the other of said chambers, said loop including heater means in advance of one of said inlet ports.

2. An engine comprising first and second trochoidal chambers, a polygonal piston rotatably mounted in each chamber, two inlet and two outlet ports in each of said chambers, a first closed circuit loop respectively connecting a first pair of inlet and outlet ports in said first chamber to a first pair of outlet and inlet ports in said second chamber and including heater means in advance of one of said inlet ports in said first chamber, and a second closed circuit loop respectively connecting a second pair of inlet and outlet ports in said first chamber to a second pair of outlet and inlet ports in said second chamber and including heater means in advance of the other one of said inlet ports in said first chamber.

3. An engine as claimed in claim 2 including cooling means for said second chamber.

4. An engine as claimed in claim 2 wherein said polygonal pistons each have three lobes which make sealing contact with the wall of the trochoidal chamber in which it rotates during rotation thereof.

5. An engine as claimed in claim 4 in which the ports in said first chamber are constructed and arranged such that the cycles of intake, expansion and exhaust result from rotation of said piston.

6. An engine as claimed in claim 4 in which the ports in said second chamber are consructed and arranged such that the cycles of intake, compression and exhaust result from rotation of said piston.

7. An engine as claimed in claim 2 including heat exchange means between said first and second closed circuit loops.

8. An engine as claimed in claim 2 including first heat exchange means coupling, in heat transfer relationship, one outlet port of said second chamber to one inlet port of said second chamber and second heat exchange means coupling, in heat transfer relationship, the other outlet port of said second chamber to the other inlet port of said second chamber.

9. An engine as claimed in claim 8 including cooling means in advance of said inlet ports of said second chamber.

10. A rotary piston external combustion engine comprising trochoidal chambers, a polygonal piston rotatably mounted in each chamber, inlet and outlet ports in each chamber, means interconnecting the outlet ports of said chambers with inlet ports of other chambers to provide closed loop connections for said chambers, and heater means in advance of less than all said inlet ports.

References Cited

UNITED STATES PATENTS 3,370,418   2/1968   Kelly _____ 60—24

CARROLL B. DORITY, JR., *Primary Examiner.*

U.S. Cl. X.R.

62—6